United States Patent
Takahira et al.

(10) Patent No.: US 6,207,272 B1
(45) Date of Patent: Mar. 27, 2001

(54) PEELABLE HEAT-CONDUCTIVE AND PRESSURE-SENSITIVE ADHESIVE AND ADHESIVE SHEET CONTAINING THE SAME

(75) Inventors: Hitoshi Takahira; Masahiro Oura; Kazuyuki Kitakura; Takao Yoshikawa; Shigeki Muta, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/079,195

(22) Filed: May 15, 1998

(30) Foreign Application Priority Data

May 16, 1997 (JP) ...................................... 9-127619

(51) Int. Cl.$^7$ ................ C09J 7/02; B32B 7/12
(52) U.S. Cl. .................. 428/355 AC; 525/218; 428/344; 427/208.4
(58) Field of Search .............. 525/218; 428/344, 428/355 AC; 427/208.4

(56) References Cited

U.S. PATENT DOCUMENTS

| | | | |
|---|---|---|---|
| 4,272,573 | * | 6/1981 | Ewald et al. ............. 428/40 |
| 5,079,047 | * | 1/1992 | Bogaert et al. ........... 428/41 |
| 5,213,868 |   | 5/1993 | Liberty et al. ........... 428/131 |
| 5,298,791 |   | 3/1994 | Liberty e tal. ........... 257/707 |
| 5,612,136 | * | 3/1997 | Everaerts et al. ......... 428/355 AK |
| 5,753,362 | * | 5/1998 | Kawase et al. ........... 428/327 |

FOREIGN PATENT DOCUMENTS

| | | |
|---|---|---|
| 0 342 811 | 11/1989 | (EP) . |
| 0 566 093 | 10/1993 | (EP) ................. C09J/7/02 |

OTHER PUBLICATIONS

U.S. Application Ser. No. 09/194,180 filed Nov. 24, 1998. No. IDS was submitted with applicants "Proprietary IDS".*
Patent Abstracts of Japan, vol. 016, No. 126, Dec. 24, 1991, (corresponds to JPA 3–292379).

* cited by examiner

Primary Examiner—Daniel Zirker
(74) Attorney, Agent, or Firm—Sughrue, Mion, Zinn, Macpeak & Seas, PLLC

(57) ABSTRACT

A peelable heat-conductive and pressure-sensitive adhesive is disclosed, which comprises: (a) 100 parts by weight of a polymer produced from a monomer mixture comprising from 70 to 100% by weight of one or more alkyl (meth) acrylates in which the alkyl groups on the average have 2 to 14 carbon atoms and from 0 to 30% by weight of one or more monoethylenic monomers copolymerizable therewith, each based on the amount of the monomer mixture; (b) from 20 to 400 parts by weight of a plasticizer having a boiling point of 150° C. or higher; and (c) from 10 to 1,000 parts by weight of a heat-conductive filler. Also disclosed is an adhesive sheet comprising a substrate and, formed on one or each side thereof, a layer of the adhesive. The pressure-sensitive adhesive can exhibit tight adhesion during use and easy peeling after use.

1 Claim, No Drawings

PEELABLE HEAT-CONDUCTIVE AND PRESSURE-SENSITIVE ADHESIVE AND ADHESIVE SHEET CONTAINING THE SAME

FIELD OF THE INVENTION

The present invention relates to a peelable heat-conductive and pressure-sensitive adhesive and an adhesive sheet thereof in a tape, sheet, or another form which both are used, for example, for fixing electronic parts to radiating members or for the purpose of member fixing in various fields including building materials, vehicles, aircraft, and ships.

BACKGROUND OF THE INVENTION

Electronic parts such as hybrid packages, multimodules, and integrated circuits sealed with a plastic or metal have come to generate a larger amount of heat as a result of the progress in the degree of integration in IC's, etc. Due to the enhanced increase in temperature, there is a fear that such electronic parts may have a functional fault. A generally employed technique for avoiding this trouble is to attach a radiating member, e.g., a heat sink, to an electronic part by means of an appropriate adhesive material.

Many adhesive materials for use in the above application are known. Examples thereof include an adhesive comprising an acrylic monomer, aluminum particles, and a polymerization initiator (see U.S. Pat. No. 4,722,960), an electroconductive adhesive tape in which the adhesive layer contains silver particles having a diameter larger than the thickness of the adhesive layer (see U.S. Pat. No. 4,606,962), and a heat-conductive, electrical insulating, pressure-sensitive adhesive comprising an acrylic polymer having polar groups and a heat-conductive filler randomly dispersed in the polymer (see JP-A-6-88061 which corresponds to EP 566093 A1). The term "JP-A" as used herein means an "unexamined published Japanese patent application".

Recently, radiating members, e.g., heat sinks, which have been bonded with an adhesive to electronic parts are frequently detached therefrom for reuse when the electronic parts are discarded or subjected to module exchange. In this case, the adhesive material is required not only to have tight adhesion during use to satisfactorily perform its fixing function, but to have easy peeling which enables the radiating members to be easily detached when the electronic parts are discarded or subjected to module exchange. However, none of the known adhesive materials described above can meet these requirements.

Known design ideas which have been employed for controlling adhesive properties are to reduce adhesive strength by increasing crosslinking density and to improve wetting ability by softening. However, the former technique, based on increasing crosslinking density, reduces wetting ability to impair adhesion to adherends, while the latter technique, based on softening, causes an increase in adhesive strength. Consequently, it is exceedingly difficult to use the design ideas described above for obtaining tight adhesion during use and obtaining easy peeling at the time of discarding or module exchange as described above, i.e., for obtaining both of the two properties.

Under these circumstances, a curable pressure-sensitive adhesive has been proposed in JP-A-56-61468, JP-B-1-53989, JP-B-2-42393, etc. The term "JP-B" as used herein means an "examined Japanese patent publication". This curable adhesive has been designed to be in a soft state for attaining high adhesive strength in the initial stage and to be capable of being reduced in adhesive strength at the time of detachment by increasing the crosslinking density of the adhesive through curing treatment with light or heat or by foaming the adhesive. However, such pressure-sensitive adhesives have drawbacks, for example, that they necessitate the step of treatment with light or heat to complicate the process, equipment, etc., and that the applications thereof are limited because of limited allowable conditions therefor.

SUMMARY OF THE INVENTION

Accordingly, an object of the present invention is to provide a peelable heat-conductive and pressure-sensitive adhesive which is a noncuring adhesive material unlike the proposed pressure-sensitive adhesive described above, and is capable of achieving both high adhesion during use and easy peeling after use. Another object of the present invention is to provide an adhesive sheet containing the adhesive.

The present inventors made intensive studies in order to accomplish the above objects. As a result, they have found that a noncuring adhesive material obtained by incorporating a large amount of a specific plasticizer into an acrylic polymer as the base polymer and further adding a heat-conductive filler thereto is excellent in heat conductivity and wetting ability, has tight adhesion to adherends even when applied at a low pressure, and has excellent peeling after use because the adhesive strength thereof is moderately low. Namely, they have found that the above noncuring adhesive material, when used for bonding electronic parts to radiating members, shows excellent radiating properties and can be easily peeled off at the time of discarding or module exchange. The present invention has been completed based on this finding.

The present invention provides a peelable heat-conductive and pressure-sensitive adhesive comprising: (a) 100 parts by weight of a polymer produced from a monomer mixture comprising from 70 to 100% by weight of an alkyl (meth)acrylate having 2 to 14, on average, carbon atoms in the alkyl group and from 0 to 30% by weight of a monoethylenic monomer copolymerizable therewith, each based on the total amount of the monomer mixture; (b) from 20 to 400 parts by weight of a plasticizer having a boiling point of 150° C. or higher; and (c) from 10 to 1,000 parts by weight of a heat-conductive filler. The present invention further provides an adhesive sheet comprising a substrate and, formed on one or each side thereof, a layer of the peelable heat-conductive and pressure-sensitive adhesive having the constitution described above.

DETAILED DESCRIPTION OF THE INVENTION

The polymer used as ingredient (a) in the present invention basically governs adhesive properties such as wetting ability and flexibility. This polymer is an acrylic polymer produced by polymerizing one or more monomers comprising from 70 to 100% by weight, preferably from 75 to 100% by weight, more preferably from 85 to 95% by weight of one or more alkyl (meth)acrylates in which the alkyl groups on the average have 2 to 14 carbon atoms and from 30 to 0% by weight, preferably from 25 to 0% by weight, more preferably from 15 to 5% by weight of one or more monoethylenic monomers copolymerizable therewith.

Among the above monomers, the alkyl (meth)acrylates having 2 to 14, on average, carbon atoms in the alkyl group are preferably the esters of acrylic or methacrylic acid with nontertiary alkyl alcohols. Examples of the alkyl group include methyl, ethyl, propyl, butyl, isobutyl, pentyl, isopentyl, hexyl, heptyl, octyl, isooctyl, nonyl, isononyl, decanyl, and isodecanyl. A mixture of (meth)acrylates in which the alkyl groups on the average have 2 to 14 carbon atoms may also be used.

The monoethylenic monomers copolymerizable with the alkyl (meth)acrylates are used for improving adhesive properties by incorporating functional groups or polar groups, for improving cohesive force or heat resistance by controlling the glass transition temperature of the polymer, or for other purposes. Examples thereof include carboxyl- or hydroxyl-containing monomers such as acrylic acid, methacrylic acid, maleic acid, caprolactone-modified acrylates, 2-acryloyloxyethylsuccinic acid, 2-acryloyloxyethylphthalic acid, caprolactone-modified hydroxyethyl (meth)acrylates, 2-hydroxyethyl acrylate, 2-hydroxypropyl acrylate, and 2-hydroxyhexyl acrylate and nitrogen-containing monomers such as acrylamide, N-vinylpyrrolidone, and acryloylmorpholine. One or more of such monoethylenic monomers can be used, if desired.

The polymer of ingredient (a) can be obtained by polymerizing the monomers described above according to the solution, emulsion, bulk, or suspension polymerization method or another method. In bulk polymerization, it is possible to conduct the polymerization by irradiation with a radiation such as ultraviolet or electron beams. A combination of solution polymerization and radiation-induced polymerization can also be used. The polymer generally has a weight-average molecular weight of from 1,000,000 to 4,000,000.

Among those polymerization methods, use of solution polymerization has problems, for example, that the polymer may cause corrosion of electronic parts due to a residual solvent contained therein, and that the adhesive layer may swell, peel off, or slide at high temperatures as a result of vaporization of the residual solvent. Use of emulsion polymerization is disadvantageous in that the polymer may suffer emulsifier bleeding and this may cause fouling, adhesion failure, or reduced moisture resistance. It is therefore preferred to employ bulk polymerization, in particular ultraviolet-induced bulk polymerization. Use of the bulk polymerization method is effective in avoiding the aforementioned various problems attributable to the use of an organic solvent or an emulsifier, and in increasing the molecular weight of the polymer by irradiation with a radiation having a relatively low intensity, e.g., ultraviolet, to thereby obtain a pressure-sensitive adhesive having a high degree of crosslinking and a high cohesive force and having satisfactory heat resistance.

The plasticizer used as ingredient (b) in the present invention serves to improve adhesion by improving wetting ability and to impart easy peeling by reducing adhesive strength. From the standpoint of heat resistance, etc., a plasticizer having a boiling point of 150° C. or higher, preferably 300° C. or higher, is used. Use of a plasticizer having a boiling point lower than 150° C. is undesirable in that it vaporizes during long-term use and may foul electronic parts, etc.

Examples of the plasticizer having such a high boiling point include phthalic acid compounds such as dimethyl phthalate, diethyl phthalate, dibutyl phthalate, diheptyl phthalate, di-2-ethylhexyl phthalate, diisononyl phthalate, diisodecyl phthalate, dibutylbenzyl phthalate, and butyl phthalyl butyl glycolate and trimellitic acid compounds such as tributyl trimellitate, tri-2-ethylhexyl trimellitate, tri-n-octyl trimellitate, and triisodecyl trimellitate.

Other examples of the plasticizer for use in the present invention include esters of aliphatic dibasic acids, such as dibutyl fumarate, dibutyl maleate, di-2-ethylhexyl maleate, diisobutyl adipate, diisononyl adipate, diisodecyl adipate, dibutoxydecyl adipate, dibutyl sebacate, and di-2-ethylhexyl sebacate, phosphoric ester compounds such as triethyl phosphate, triphenyl phosphate, tricresyl phosphate, trixylenyl phosphate, and cresyl phenyl phosphate, epoxy compounds such as diisodecyl 4,5-epoxytetrahydrophthalate, and other compounds such as butyl oleate and chlorinated paraffin.

One or more plasticizer compounds selected, for example, from the compounds enumerated above can be used as the plasticizer of ingredient (b). The added amount thereof is generally from 20 to 400 parts by weight, preferably from 40 to 250 parts by weight, more preferably from 50 to 150 parts by weight, per 100 parts by weight of the polymer of ingredient (a) (or the monomer(s) for constituting the polymer), from the standpoints of adhesion improvement, adhesive strength reduction, or prevention of the adhesion failure caused by bleeding.

JP-A-2-18486 discloses a general pressure-sensitive adhesive different from the heat-conductive and pressure-sensitive adhesive of the present invention. This prior art adhesive, which is based on an acrylic polymer, contains a plasticizer so as to have improved adhesion to plasticized vinyl resins. However, in the preferred embodiments of the disclosed technique, a plasticizer is added in an amount as small as about from 2 to 10% by weight based on the polymer. Namely, this prior art technique is intended to enhance adhesive strength by adding a small amount of a plasticizer, and is not intended to reduce adhesive strength as in the present invention. Consequently, the technique disclosed in the above reference differs from the adhesive of the present invention.

The heat-conductive filler used as ingredient (c) in the present invention serves to impart satisfactory heat conductivity to the pressure-sensitive adhesive. Examples thereof include $SiO_2$, $TiB_2$, BN, $Si_3N_4$, $TiO_2$, MgO, NiO, CuO, $Al_2O_3$, and $Fe_2O_3$. The added amount thereof is generally from 10 to 1,000 parts by weight, preferably from 10 to 120 parts by weight, per 100 parts by weight of the polymer of ingredient (a) (or the monomer(s) for constituting the polymer). If the amount of ingredient (c) is smaller than 10 parts by weight, satisfactory heat conductivity is difficult to obtain. If the amount thereof exceeds 1,000 parts by weight, the resultant adhesive is apt to have problems concerning adhesive properties and handleability.

The heat-conductive filler has a particle diameter of generally from 0.5 to 250 μm, preferably from 1 to 100 μm, more preferably from 5 to 30 μm. The particles of the filler may have any shape selected, for example, from spherical, acicular, flaky, and starlike shapes according to the Theological properties of the monomers and of the pressure-sensitive adhesive. The heat-conductive filler preferably has a purity of 95% by weight or higher, more preferably 98% by weight or higher, from the standpoint of avoiding an excessive viscosity increase during adhesive preparation.

The peelable heat-conductive and pressure-sensitive adhesive of the present invention can be obtained by compounding the polymer of ingredient (a) with the plasticizer having a boiling point of 150° C. or higher of ingredient (b) and the heat-conductive filler of ingredient (c) in a proportion within the range specified above. An external crosslinking agent, e.g., a polyfunctional isocyanate compound, or an internal crosslinking agent, e.g., a crosslinker, may be added to the adhesive to conduct a suitable crosslinking treatment. Furthermore, known additives such as an antioxidant and a coupling agent may be added, if desired. These additives including crosslinking agents can be added in a total amount of not more than about 30 parts by weight per 100 parts by weight of the polymer of ingredient (a).

The adhesive sheet of the present invention, which is a sheet or tape form structure suitable for use in any of the aforementioned applications, comprises a substrate and a layer of the peelable heat-conductive and pressure-sensitive adhesive having the constitution described above formed on one or each side of the substrate. Examples of the substrate include films of plastics such as polyesters and polyimides, flame-retardant films or nonwoven fabrics. Examples thereof further include substrates made of materials excellent in heat resistance and heat conductivity, such as sheets of polymers having excellent heat conductivity, e.g., a heat-conductive silicone rubber, and metal foils such as copper foil, aluminum foil, stainless-steel foil, and beryllium-copper foil. These substrates usually have a thickness of about from 12 $\mu$m to 4 mm. The thickness of each layer of the heat-conductive and pressure-sensitive adhesive formed on the substrate is generally from 10 to 150 $\mu$m.

The adhesive sheet may be produced by a method comprising forming a layer of the heat-conductive and pressure-sensitive adhesive on a release liner and transferring the adhesive layer to one or each side of a substrate, or by a method comprising forming a layer of the heat-conductive and pressure-sensitive adhesive directly on one or each side of a substrate without using a release liner. A suitable method can be employed according to the kind of the substrate. In the case where the polymer of ingredient (a) for use as a component of the heat-conductive and pressure-sensitive adhesive is to be obtained by bulk polymerization, e.g., ultraviolet-induced polymerization, in such a process for adhesive-sheet production, an adhesive sheet according to the present invention can be produced in the following manner. The monomer(s) or oligomer for ingredient (a) is mixed with a plasticizer of ingredient (b) and a heat-conductive filler of ingredient (c), and the resultant polymerizable composition is applied on a release liner or substrate. Subsequently, the composition applied is bulk-polymerized to thereby form a polymer simultaneously with a heat-conductive and pressure-sensitive adhesive layer.

The adhesive sheet of the present invention thus produced generally has an adhesive strength of 200 g/20 mm width or lower, preferably 170 g/20 mm width or lower, when applied to aluminum, used as the main heat sink material, and measured (at 23° C.) in accordance with JIS-Z-1522. Since the adhesive sheet shows such weak adhesion, it can be easily peeled off after use. From the standpoint of maintaining an adhesive strength sufficient for fixing during use, the above adhesive strength of the adhesive sheet is preferably 5 g/20 mm width or higher, more preferably 50 g/20 mm width or higher. The adhesive strength thereof can be easily adjusted by controlling the monomer composition, the amount of the plasticizer, degree of crosslinking density, the thickness of the adhesive layer and the like.

In the case where the adhesive sheet of the present invention is used for fixing an electronic part to a radiating member, this fixing may be accomplished by merely interposing the adhesive sheet of the present invention between the two adherends and lightly pressing the electronic part against the radiating member. As a result, tight adhesion is obtained and the expected fixing can be attained. At the time when the electronic part is discarded or subjected to module exchange, the electronic part and the radiating member can be easily separated from each other by lightly pulling either adherend. Thus, the handling thereof is easy.

Examples of the electronic part to be fixed include IC chips, hybrid packages, multichip modules, power transistors, and integrated circuits sealed with a plastic or metal. Examples of the radiating member as the other adherend include heat sinks in a plate, sheet, or another form made of a metal selected from those enumerated above as examples of the material of the heat-conductive substrate. Examples thereof further include other radiators. These heat sinks generally have a thickness of from 10 $\mu$m to 10 mm, preferably from 50 $\mu$m to 5 mm, more preferably from 100 $\mu$m to 3 mm. However, the thicknesses of the heat sinks are not limited to the above ranges. A radiator having an appropriate structure, e.g., one having cooling fins, may also be used.

The peelable heat-conductive and pressure-sensitive adhesive of the present invention and the adhesive sheet containing the adhesive can be used not only for fixing electronic parts to radiating members, but also for member fixing and other purposes in various fields including building materials, vehicles, aircraft, and ships. It is a matter of course that the adhesive and adhesive sheet of the present invention produce the same effects as the above even when used in applications in those various fields.

The present invention will be explained below in more detailed by reference to Examples thereof, but the invention should not be construed as being limited thereto. Hereinafter, all parts are by weight.

EXAMPLE 1

A mixture of 95 parts of 2-ethylhexyl acrylate and 5 parts of acrylic acid was subjected to solution polymerization in 210 parts of ethyl acetate in the presence of 0.4 parts of 2,2-azobisisobutyronitrile in a nitrogen atmosphere with stirring at 60 to 80° C. Thus, a pressure-sensitive adhesive solution was obtained which had a viscosity of 120 P, a polymerization rate (conversion) of 99.2% by weight, and a solid content of 30% by weight.

To this solution were added 3 parts of a polyfunctional isocyanate crosslinking agent, 100 parts of di-2-ethylhexyl phthalate (boiling point: 386° C.), and 120 parts of silica (SiO$_2$) (purity, 99.8% by weight; average particle diameter, 1.8 $\mu$m) per 100 parts of the polymer. The resultant mixture was homogenized to obtain a peelable heat-conductive and pressure-sensitive adhesive.

This heat-conductive and pressure-sensitive adhesive was applied on a polyester film whose surface had been treated with a release agent. The coating was dried in a hot-air drying oven first at 40° C. for 5 minutes and then at 130° C. for 5 minutes to form a pressure-sensitive adhesive layer having a thickness of 50 $\mu$m. This adhesive layer was transferred to each side of a copper foil having a thickness of 30 $\mu$m. Thus, an adhesive sheet having a total thickness of 130 $\mu$m was produced.

EXAMPLE 2

A premix consisting of 75 parts of isooctyl acrylate, 20 parts of butyl acrylate, 5 parts of acrylic acid, and 0.1 part of 2,2-dimethoxy-2-phenylacetone (photopolymerization initiator) was exposed to ultraviolet in a nitrogen atmosphere to partially polymerize the monomers. Thus, a coatable syrup having a viscosity of 40 P was obtained.

To this syrup were added 0.2 parts of trimethylolpropane triacrylate (crosslinker), 80 parts of tricresyl phosphate (boiling point: 410° C.), and 70 parts of boron nitride (BN) (purity, 99.7% by weight; average particle diameter, 8 $\mu$m)

per 100 parts of the monomers. The resultant mixture was homogenized to obtain a polymerizable composition.

This polymerizable composition was applied on a polyester film whose surface had been treated with a release agent. The coating was photopolymerized in a nitrogen gas atmosphere by irradiation with 900 mJ/cm$^2$ ultraviolet using a high-pressure mercury lamp having a light intensity of 5 mW/cm$^2$. The coating was then dried in a circulating hot-air drying oven at 130° C. for 5 minutes to form a pressure-sensitive adhesive layer having a thickness of 50 μm. This adhesive layer was transferred to each side of an aluminum foil having a thickness of 30 μm. Thus, an adhesive sheet having a total thickness of 130 μm was produced.

EXAMPLE 3

A premix consisting of 70 parts of isooctyl acrylate, 20 parts of butyl acrylate, 10 parts of acryloylmorpholine, and 0.1 part of 2,2-dimethoxy-2-phenylacetone (photopolymerization initiator) was exposed to ultraviolet in a nitrogen atmosphere to partially polymerize the monomers. Thus, a coatable syrup having a viscosity of 4,000 cP was obtained.

To this syrup were added 0.2 parts of trimethylolpropane triacrylate (crosslinker), 70 parts of tri-2-ethylhexyl trimellitate (boiling point: 430° C.), and 170 parts of alumina ($Al_2O_3$) (purity, 99.7% by weight; average particle diameter, 3.7 μm) per 100 parts of the monomers. The resultant mixture was homogenized to obtain a polymerizable composition.

This polymerizable composition was applied on a polyester film whose surface had been treated with a release agent. The coating was photopolymerized in a nitrogen gas atmosphere by irradiation with 900 mJ/cm$^2$ ultraviolet using a high-pressure mercury lamp having a light intensity of 5 mW/cm$^2$. The coating was then dried in a circulating hot-air drying oven at 130° C. for 5 minutes to form a pressure-sensitive adhesive layer having a thickness of 50 μm. This adhesive layer was transferred to each side of an aluminum foil having a thickness of 30 μm. Thus, an adhesive sheet having a total thickness of 130 μm was produced.

EXAMPLE 4

A premix consisting of 100 parts of isooctyl acrylate and 0.1 part of 2,2-dimethoxy-2-phenylacetone (photopolymerization initiator) was exposed to ultraviolet in a nitrogen atmosphere to partially polymerize the monomer. Thus, a coatable syrup having a viscosity of 40 P was obtained.

To this syrup were added 3 parts of trimethylolpropane triacrylate (crosslinker), 100 parts of diisononyl phthalate (boiling point: 230° C.), and 800 parts of boron nitride (BN) (purity, 99.7% by weight; average particle diameter, 8 μm) per 100 parts of the monomer. The resultant mixture was homogenized to obtain a polymerizable composition.

This polymerizable composition was applied on a polyester film whose surface had been treated with a release agent. The coating was photopolymerized in a nitrogen gas atmosphere by irradiation with 900 mJ/cm$^2$ ultraviolet using a high-pressure mercury lamp having a light intensity of 5 mW/cm$^2$. The coating was then dried in a circulating hot-air drying oven at 130° C. for 5 minutes to form a pressure-sensitive adhesive layer having a thickness of 50 μm. This adhesive layer was transferred to each side of an aluminum foil having a thickness of 30 μm. Thus, an adhesive sheet having a total thickness of 130 μm was produced.

COMPARATIVE EXAMPLE 1

An adhesive sheet was produced in the same manner as in Example 1, except that the amount of silica ($SiO_2$) incorporated as a heat-conductive filler was changed to 60 parts and that the incorporation of 100 parts of di-2-ethylhexyl phthalate as a plasticizer was omitted.

COMPARATIVE EXAMPLE 2

An adhesive sheet was produced in the same manner as in Example 2, except that the incorporation of 70 parts of boron nitride (BN) as a heat-conductive filler was omitted.

COMPARATIVE EXAMPLE 3

A polymerizable composition was prepared in the same manner as in Example 2, except that the monomer mixture was changed to one composed of 55 parts of isooctyl acrylate, 5 parts of butyl acrylate, and 40 parts of acrylic acid. The polymerizable composition was photopolymerized and further treated in the same manner as in Example 2 to produce an adhesive sheet.

The adhesive sheets obtained in Examples 1 to 4 and Comparative Examples 1 to 3 were subjected to an adhesive strength test, heat resistance test, and peeling test in the following manners. The results of these tests are shown in Table given later.

Adhesive Strength Test

In accordance with JIS-Z-1522, each adhesive sheet was applied to an aluminum plate by placing the adhesive sheet on the plate and rolling a 2-kg roller forward and backward once on the sheet, and the resultant test piece was examined for 180° peel adhesive strength at ordinary temperature (23° C.).

Heat Resistance Test

By using a heat-conductive and pressure-sensitive adhesive sheet, a transistor in a TO-220 package (in terms of a standard of Joint Electron Device Engineering Council) was adhered and fixed under a contact bonding pressure of 2 kg/cm$^2$ to a heat sink which had been immersed in water to obtain a constant temperature. Then, a definite output was supplied to the transistor and the difference in the transistor temperature (T2) from the temperature of the lower surface of the heat-conductive and pressure-sensitive adhesive sheet (T1) was measured. Next, the heat resistance was calculated in accordance with the following formula.

Heat Resistance (° C.·cm$^2$/W)=(T2−T1)×A/P

A: transistor area (cm$^2$).

P: electrical power (W) consumed by transistor.

The transistor temperature (T2) was measured by using a thermocouple spot-welded to the metallic base of the transistor package. On the other hand, the temperature of the lower surface of the heat-conductive and pressure-sensitive adhesive sheet (T1) was measured by forming a small hole in the heat sink and inserting a thermocouple thereinto. The thermocouple was placed in the heat sink such that it did not give influence onto the adhered area of the heat-conductive and pressure-sensitive adhesive sheet, with the proviso that the location of the thermocouple was as near as possible to the interface between the heat sink and the adhesive sheet.

Peeling Test

An IC (resin package) was fixed with each adhesive sheet to a heat sink having a size of 20 mm by 20 mm and made of aluminum (with black alumite coating). Thereafter, the IC was manually separated from the heat sink. The bonded samples which could be easily separated are indicated by "A", while those which were difficult to separate are indicated by "B".

TABLE

|  | Adhesive Strength (g/20 mm width) | Heat Resistance (° C. · cm²/W) | Peeling Test |
|---|---|---|---|
| Example 1 | 150 | 6.5 | A |
| Example 2 | 170 | 3.3 | A |
| Example 3 | 190 | 6.0 | A |
| Example 4 | 10 | 3.0 | A |
| Comparative Example 1 | 800 | 6.5 | B |
| Comparative Example 2 | 200 | 13.0 | A |
| Comparative Example 3 | 1,000 | 5.5 | B |

The results given in Table show the following. The adhesive sheets obtained in Examples 1 to 4 according to the present invention had a low heat resistance, i.e., excellent heat conductivity, and an aluminum plate adhesive strength not higher than 200 g/20 mm width and could be easily peeled off after use. Despite such a low adhesive strength, these adhesive sheets proved to sufficiently perform their fixing function due to their satisfactory adhesion. In contrast, the adhesive sheets obtained in Comparative Examples 1 to 3 had problems, for example, that they had too high an adhesive strength to be peeled off after use, and that one of these had poor heat conductivity.

As described above, the present invention can provide a peelable heat-conductive and pressure-sensitive adhesive and an adhesive sheet containing the same which each can achieve tight adhesion during use and easy peeling after use and has excellent heat conductivity, by incorporating a large amount of a specific plasticizer into an acrylic polymer as the base polymer and adding a heat-conductive filler thereto.

While the invention has been described in detail and with reference to specific embodiments thereof, it will be apparent to one skilled in the art that various changes and modifications can be made therein without departing from the spirit and scope thereof.

What is claimed is:

1. An adhesive sheet comprising a substrate and, formed on one or each side thereof, a layer of a peelable heat-conductive and pressure-sensitive adhesive, wherein the peelable heat-conductive and pressure-sensitive adhesive comprises:

(a) 100 parts by weight of a polymer produced from a monomer mixture comprising from 70 to 100 % by weight of an alkyl (meth)acrylate having 2 to 14, on average, carbon atoms in the alkyl group and from 0 to 30 % by weight of a monoethylenic monomer copolymerizable therewith, each based on the total amount of the monomer mixture;

(b) from 20 to 400 parts by weight of a plasticizer having a boiling point of 150° C. or higher; and (c) from 10 to 1,000 parts by weight of a heat-conductive fillers which has adhesive strength of 200 gW20 mm width or lower when applied to aluminum.

* * * * *